United States Patent

Yoshida et al.

[11] Patent Number: 5,194,337
[45] Date of Patent: Mar. 16, 1993

[54] GLASS JOINT BODY AND METHOD OF MANUFACTURING THE SAME

[75] Inventors: Akihiko Yoshida, Iwakura; Tomonori Takahashi, Chita; Makoto Murai, Nagoya, all of Japan

[73] Assignee: NGK Insulators, Ltd., Japan

[21] Appl. No.: 699,735

[22] Filed: May 14, 1991

[30] Foreign Application Priority Data

| May 18, 1990 | [JP] | Japan | 2-126895 |
| Jul. 4, 1990 | [JP] | Japan | 2-175380 |
| Nov. 16, 1990 | [JP] | Japan | 2-308762 |
| Nov. 22, 1990 | [JP] | Japan | 2-315866 |

[51] Int. Cl.$^5$ .......................................... B32B 17/06
[52] U.S. Cl. .................... 428/426; 428/428; 428/432; 428/688; 428/689; 428/697; 428/699; 428/702; 501/49; 501/66; 501/67; 429/104; 429/185
[58] Field of Search ............... 428/426, 428, 432, 688, 428/689, 697, 699, 702; 65/36, 43, 58; 501/49, 66, 77; 429/104, 185

[56] References Cited

U.S. PATENT DOCUMENTS

| 3,881,904 | 5/1975 | Stokes et al. | 65/43 |
| 3,985,576 | 10/1976 | Lingscheit et al. | 429/103 |
| 4,291,107 | 9/1981 | Barry et al. | 429/185 |
| 4,311,772 | 1/1982 | Herczog | 429/185 |
| 4,968,568 | 11/1990 | Higley | 429/104 |

FOREIGN PATENT DOCUMENTS 2207545 2/1989 United Kingdom .

Primary Examiner—Ellis P. Robinson
Assistant Examiner—Timothy M. Speer
Attorney, Agent, or Firm—Parkhurst, Wendel & Rossi

[57] ABSTRACT

In order to improve the reliability of a glass joint body, a first ceramic member and a second ceramic member are connected by using (a) glass consisting of 10~65 wt % of $SiO_2$, 30 wt % or less of $Na_2O$, and the balance of $B_2O_3$ and $Al_2O_3$, (b) glass including less than 10 wt % of $SiO_2$, and 30~80 wt % of $B_2O_3$, (c) glass including substantially none of $SiO_2$, and 30~80 wt % of $B_2O_3$, or (d) glass consisting of 10~65 wt % of $SiO_2$, 20 wt % or less of $Na_2O$, 30 wt % or less of $Al_2O_3$, 20 wt % or less of MgO, and the balance of $B_2O_3$.

4 Claims, 3 Drawing Sheets

GLASS JOINT BODY AND METHOD OF MANUFACTURING THE SAME

BACKGROUND OF THE INVENTION

1. Field of the Invention

The present invention relates to glass joint bodies which are exposed to corrosive substances, and especially relates to glass joint bodies to be used for a connection between β alumina and insulation ceramics in Alkali Metal Thermo-Electric Converters (AMTEC) or a secondary cell to be used in high temperatures such as a sodium-sulfur cell. The present invention also relates to a method of manufacturing the glass joint bodies mentioned above.

2. Related Art Statement

Usually, as for one example of glass joint bodies which are exposed in corrosive substances, there is known a sodium-sulfur cell or Alkali Metal Thermo-Electric Converter.

The sodium-sulfur cells are high temperature type secondary cells which operate at 300° C.~350° C. and include metallic sodium as a cathode active material, sulfur and/or sodium polysulfide as an anode active material, a sodium ion conductive ceramic as a solid electrolyte, and a metal container. The structure of a typical sodium sulfur cell is shown in FIG. 1.

In FIG. 1, the numeral 1 is a beta alumina tube, 2 is a metal container functioning as an anode, 3 is a sulfur or sodium polysulfide, 4 is a metal container functioning as a cathode, 5 is sodium, 6 is an insulator such as α-alumina, 7 is a metal lid, 8 is a welded portion, and 9 is a conjunction glass for connecting the beta alumina tube 1 and the insulator 6. As for the beta alumina material forming the beta alumina tube 1, use is made of $\beta''$-alumina, $\beta$-alumina, and a mixture of both, or the like.

Processes for manufacturing the above-described sodium-sulfur cells generally comprise the steps of: bonding the open end periphery of the beta alumina tube 1 with the ring insulator 6 made of α-alumina by means of glass or the like; bonding the ring insulator 6 supporting the beta alumina tube 1 with the metal containers 2 and 4 by a solid phase reaction or the like at a high temperature under pressure; supplying the sodium 5 and the sulfur or sodium polysulfide 3 into the metal containers 4 and 2 respectively; and hermetically closing the metal containers 4 and 2 with lids 7 and 8 by means of welding to provide a cell.

In the sodium-sulfur cells mentioned above, the conjunction glass 9 arranged between the beta alumina tube 1 and the insulator 6 made of α-alumina and the like is corroded by the sodium, and consequently a life of the sodium-sulfur cell is decreased. To eliminate the drawback mentioned above, a conjunction glass having good durability against sodium corrosion consisting of 1 wt % alkali earth metal oxides or less, $SiO_2$: 65~75 wt. %, $B_2O_3$: 10~25 wt %, and the balance of $Al_2O_3$ and alkali metal oxides is disclosed in Japanese Patent Laid-Open Publication No. 1-54672.

The conjunction glass having the composition mentioned above has good durability against sodium corrosion as compared with known silicate glass and boron silicate glass, but does not show a sufficient durability against sodium corrosion as yet. Therefore, the conjunction glass mentioned above is also corroded by the sodium and thus there is a drawback in that a life of the sodium-sulfur cell is also decreased.

SUMMARY OF THE INVENTION

An object of the invention is to eliminate the drawbacks mentioned above and to provide a glass joint body having a reliable glass joint portion and a method of producing the glass joint body mentioned above.

According to a first aspect of the invention, a glass joint body comprises a first ceramic member and a second ceramic member which are connected by a glass consisting of 10~65 wt % of $SiO_2$, 30 wt % or less of $Na_2O$, and the balance of $B_2O_3$ and $Al_2O_3$.

According to a second aspect of the invention, a glass joint body comprises a first ceramic member and a second ceramic member which are connected by a glass including less than 10 wt % of $SiO_2$, and 30~80 wt % of $B_2O_3$.

According to a third aspect of the invention, a glass joint body comprises a first ceramic member and a second ceramic member which are connected by a glass including substantially no $SiO_2$, and 30~80 wt % of $B_2O_3$.

According to a fourth aspect of the invention, a glass joint body comprises a first ceramic member and a second ceramic member which are connected by a glass consisting of 10~65 wt % of $SiO_2$, 20 wt % or less of $Na_2O$, 30 wt % or less of $Al_2O_3$, 20 wt % or less of MgO, and the balance of $B_2O_3$.

According to a fifth aspect of the invention, a method of manufacturing a glass joint body comprises the steps of preparing (a) glass consisting of 10~65 wt % of $SiO_2$, 30 wt % or less of $Na_2O$, and the balance of $B_2O_3$ and $Al_2O_3$, (b) glass including less than 10 wt % of $SiO_2$, and 30~80 wt % of $B_2O_3$, (c) glass including substantially no $SiO_2$, and 30~80 wt % of $B_2O_3$, or (d) glass consisting of 10~65 wt % of $SiO_2$, 20 wt % or less of $Na_2O$, 30 wt % or less of $Al_2O_3$, 20 wt % or less of MgO, and the balance of $B_2O_3$; and connecting a first ceramic member and a second ceramic member by using the thus prepared glass.

In the structure of the first aspect of the invention, since the conjunction glass consisting of $SiO_2$: 10~65 wt %, $Na_2O$: 30 wt % or less, and the balance of $B_2O_3$ and $Al_2O_3$ is used for a connection between two ceramic members, a corrosion rate due to sodium can be reduced, and thus reliability of the glass joint portion can be improved. Therefore, the life of the sodium-sulfur cell can be increased.

In the glass composition of the first aspect of the invention, the reasons for limiting an amount of $SiO_2$ to 10~65 wt % and for limiting an amount of $Na_2O$ to 30 wt % or less are as follows. If an amount of $SiO_2$ is less than 10 wt %, a thermal expansion coefficient is increased and residual stress due to the connection becomes larger, and thus cracks are generated when a connection operation is performed. Moreover, if an amount of $SiO_2$ is more than 65 wt %, a corrosion rate due to Na becomes extremely high and thus cracks are generated in a short time after contacting Na. Further, if an amount of $Na_2O$ is more than 30 wt %, a thermal expansion coefficient is increased and a residual stress due to the connection becomes larger, and thus cracks are generated when a connection operation is performed.

Furthermore, it is preferred to limit an amount of $SiO_2$ to 20~60 wt % and more preferably 30~50 wt %. Moreover, it is preferred to limit an amount of $Na_2O$ to 20 wt % or less and more preferably 15 wt % or less. Further, it is preferred to limit a total amount of alkali metal oxides and alkali earth metal oxides other than Na$_2$O to 0.5 wt % or less.

In the structures of the second and third aspects of the invention, since the conjunction glass including less than 10 wt % or substantially no SiO$_2$ and 30~80 wt % of B$_2$O$_3$ is used for a connection between two ceramic members, a corrosion rate due to sodium can be controlled to be slow, and thus a reliability of the glass joint portion can be improved. Therefore, a life of the sodium-sulfur cell or the Alkali Metal Thermo-Electric Converter can be increased.

In the glass composition of the second aspect of the invention, the reason for limiting an amount of SiO$_2$ to less than 10 wt % is as follows. If an amount of SiO$_2$ is 10 wt % or more, durability against sodium corrosion of the glass is decreased, and thus cracks are generated in the glass portion due to corrosion. Moreover, in the glass composition of the third aspect of the invention, the reason for limiting an amount of SiO$_2$ to substantially zero is to obtain a glass which is not corroded at all by sodium. Moreover, in the glass compositions of the second and third aspects of the invention, the reason for limiting an amount of B$_2$O$_3$ to 30~80 wt % is as follows. If an amount of B$_2$O$_3$ is less than 30 wt %, it is not possible to generate a glassy state. Moreover, if an amount of B$_2$O$_3$ is more than 80 wt %, the glass is easily deteriorated due to water absorption. Further, it is preferred to limit an amount of Na$_2$O to 30 wt % or less, because a thermal expansion coefficient is increased and cracks are easily generated during connection operations if an amount of Na$_2$O is more than 30 wt %.

Moreover, as for an amount of Al$_2$O$_3$ and an amount of MgO, it is preferred to limit an amount of Al$_2$O$_3$ to 35 wt % or less and an amount of MgO to 40 wt % or less. This is amount of MgO is more than 40 wt %, a cantilever flexural strength of the glass joint body is largely decreased. Further, it is preferred to further limit an amount of Al$_2$O$_3$ to 13~28 wt % and an amount of MgO to 12~25 wt %, because the cantilever flexural strength thereof is increased.

In the structures of the fourth aspect of the invention, since the conjunction glass consisting of 10~65 wt % of SiO$_2$, 20 wt % of Na$_2$O or less, 30 wt % of Al$_2$O$_3$ or less, 20 wt % of MgO or less, and the remainder of B$_2$O$_3$ is used for a connection between two ceramic members, a corrosion rate due to sodium can be reduced, and thus a reliability of the glass joint portion can be improved. Therefore, a life of the sodium-sulfur cell or the Alkali Metal Thermo-Electric Converter can be increased.

In the glass composition of the fourth aspect of the invention, the reasons for limiting an amount of SiO$_2$ to 10~65 wt % and for limiting an amount of Na$_2$O to 20 wt % or less are as follows. If an amount of SiO$_2$ is less than 10 wt %, a thermal expansion coefficient is increased and a residual stress due to the connection becomes larger, and thus cracks are generated when a connection operation is performed. Moreover, if an amount of SiO$_2$ is more than 65 wt %, corrosion generation due to sodium becomes extremely high, and thus cracks are generated in a short time after contacting Na. Further, if an amount of Na$_2$O is more than 20 wt %, a thermal expansion coefficient is increased and a residual stress due to the connection becomes larger, and thus cracks are generated when a connection operation is performed. Furthermore, it is preferred to limit an amount of SiO$_2$ as 20~40 wt %.

Moreover, the reason for limiting an amount of Al$_2$O$_3$ to 30 wt % or less and for limiting an amount of MgO to 20 wt % or less is that, if an amount of Al$_2$O$_3$ is more than 30 wt % or an amount of MgO is more than 20 wt %, the glass crystallizes and cracks are generated.

Further, preferable methods of connecting two ceramic members are (1) a method comprising the steps of arranging a glass frit between an alpha alumina ceramic and a beta alumina ceramic, and melting the glass by heat to connect the alpha alumina ceramic and the beta alumina ceramic by reacting the glass and the alpha alumina ceramic and also by reacting the glass and the beta alumina ceramic, or (2) a method comprising the steps of arranging a glass block on a space between an alpha alumina ceramic and beta alumina ceramic, melting the glass block by heat so that the glass block flows into the space, and connecting the alpha alumina ceramic and the beta alumina ceramic by reacting the glass and the alpha alumina ceramic and also by reacting the glass and the beta alumina ceramic.

DESCRIPTION OF THE PREFERRED EMBODIMENTS

Figure 1:
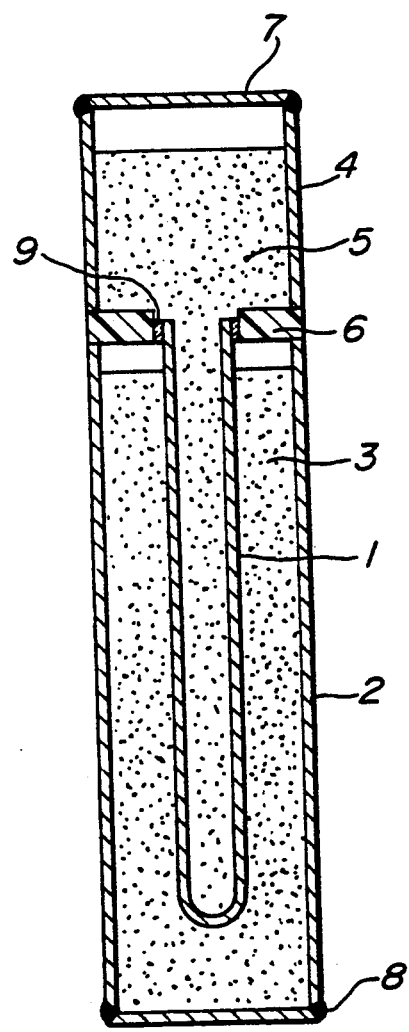
FIG. 1 is a schematic view showing a sodium sulfur cell, as one embodiment of a glass joint body according to the invention.

FIG. 1 is a schematic view showing one embodiment of a glass joint body according to the invention. In FIG. 1, the present invention is applied to a sodium-sulfur cell, and a construction of the sodium-sulfur cell is explained before, so that the explanation thereof is not repeated here. In this embodiment, as for the conjunction glass 9, use is made of (a) glass consisting of 10~65 wt % of SiO$_2$, 30 wt % or less of Na$_2$O, and the balance of B$_2$O$_3$ and Al$_2$O$_3$, (b) glass including less than 10 wt % of SiO$_2$, and 30~80 wt % of B$_2$O$_3$, (c) glass including substantially no SiO$_2$, and 30~80 wt % of B$_2$O$_3$, or (d) glass consisting of 10~65 wt % of SiO$_2$, 20 wt % or less of Na$_2$O, 30 wt % or less of Al$_2$O$_3$, 20 wt % or less of MgO and the balance of B$_2$O$_3$.

Figure 2:
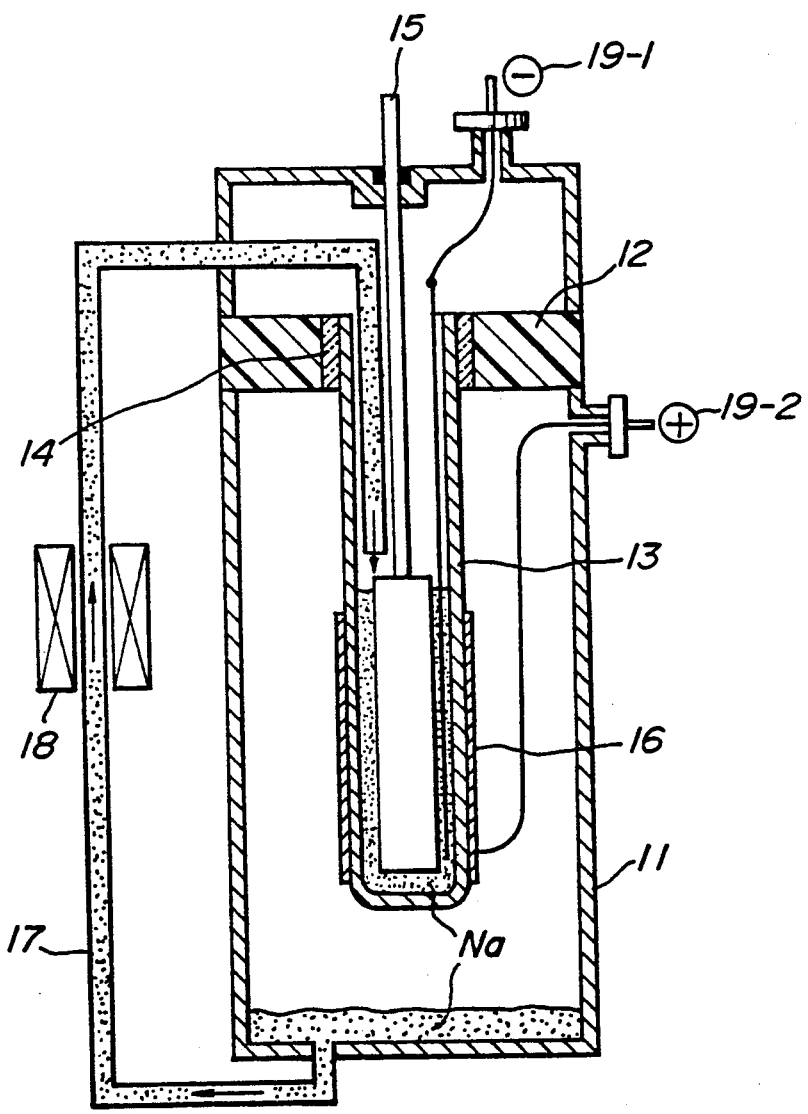
FIG. 2 is a schematic view illustrating an Alkali Metal Thermo-Electric Converter, as another embodiment of a glass joint body according to the invention.

FIG. 2 is a schematic view showing another embodiment of a glass joint body according to the invention. In FIG. 2, the present invention is applied to a thermoelectric converting apparatus. In the Alkali Metal Thermo-Electric Converter shown in FIG. 2, heat energy is directly converted into electrical energy to generate electricity by utilizing a beta alumina solid electrolyte through which a sodium ion is easily moved. In this embodiment, 11 is a stainless container, 12 is an insulator made of α-alumina fixed to the stainless container 11, 13 is a beta alumina tube, 14 is a conjunction glass for connecting the insulator 12 made of α-alumina and the beta alumina tube 13, 15 is a heater for heating sodium supplied into the beta alumina tube 13, 16 is an Mo porous electrode formed on an outer surface of the beta alumina tube 13, 17 is a pipe for supplying sodium in the stainless container 11 into the beta alumina tube 13, 18 is an electromagnetic pump for moving sodium in the pipe 17, and 19-1 and 19-2 are electrodes for output terminals. Also in this embodiment, it is necessary to use the conjunction glass 14 having a composition (a), (b), (c), or (d) mentioned above.

In the thermoelectric converting apparatus mentioned above, sodium supplied in the beta alumina tube 13 is heated by the heater 15 and is moved to the Mo porous electrode 16 by means of ion conductivity, so that an output current flows between the electrodes 19-1 and 19-2. Moreover, sodium moved to the Mo porous electrode 16 by means of ion conductivity is vaporized from the Mo porous electrode 16, and is liquefied on an inner surface of the stainless container 17, which is maintained at low temperatures. In this manner, sodium is circulated in the thermoelectric converting apparatus.

Hereinafter, actual embodiments will be explained.

EXAMPLE 1

In order to examine a connection state of a glass joint specimen and durability against sodium corrosion of a glass having various compositions in the first aspect of the invention, the following tests were performed.

At first, glass frits having various chemical compositions as shown in Table 1 were prepared by measuring respective raw materials by means of an electronic balance, mixing and crushing the raw materials in a mortar made of alumina by using a pestle, melting the mixed and crushed raw materials at 1600° C. in a platinum crucible, and dropping the melted raw materials into water. In order to make properties of the glass uniform, the thus prepared glass frits were further crushed in a mortar made of alumina by using an alumina pestle, and were re-melted at 1600° C. in a crucible made of platinum. After that, the thus re-melted glass was dropped into water, and the cooled glass was further crushed in a mortar made of alumina by using an alumina pestle to obtain glass frits for a connection.

Figure 3:
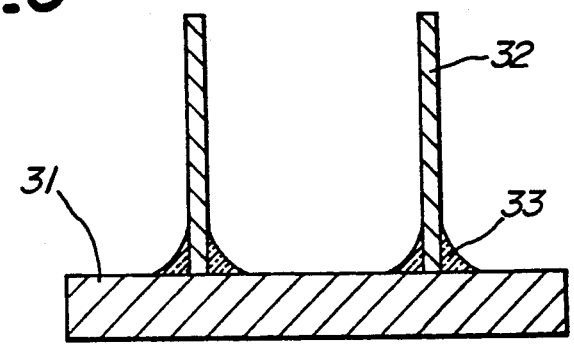
FIG. 3 is a cross sectional view depicting one embodiment of a specimen to which an anti-sodium test is performed.

By using the thus obtained glass frits, an alpha alumina circular plate 31 having a diameter of 40 mm and a thickness of 5 mm was connected to a beta alumina tube 32 having an outer diameter of 20.0 mm and an inner diameter of 17.5 mm at 1000° C. to obtain a glass joint specimen, as shown in FIG. 3. Then, the glass joint specimen was gradually cooled from 800° C. to 300° C. at a cooling rate of 0.5 C/min to eliminate stresses. After that, the thus formed glass joint specimen was immersed in sodium at 450° C. under $N_2$ atmosphere every 100 hours, and sodium was eliminated by using methanol. Then, crack generation was examined by using fluorescent penetrant inspection every 100 hours. The results and the chemical compositions of the conjunction glasses used in this example 1 are shown in Table 1.

TABLE 1

| Specimen No. | Chemical composition (wt %) | | | | Crack generation time (hr) |
|---|---|---|---|---|---|
| | $SiO_2$ | $Na_2O$ | $B_2O_3$ | $Al_2O_3$ | |
| present invention | | | | | |
| 1 | 64.0 | 8.0 | 13.0 | 15.0 | 500 |
| 2 | 60.0 | 8.0 | 17.0 | 15.0 | 800 |
| 3 | 50.0 | 8.0 | 27.0 | 15.0 | >1000 |
| 4 | 40.0 | 8.0 | 37.0 | 15.0 | >1000 |
| 5 | 30.0 | 8.0 | 47.0 | 15.0 | >1000 |
| 6 | 20.0 | 8.0 | 57.0 | 15.0 | 1000 |
| 7 | 10.0 | 10.0 | 55.0 | 25.0 | 600 |

TABLE 1-continued

| Specimen No. | Chemical composition (wt %) | | | | Crack generation time (hr) |
|---|---|---|---|---|---|
| | $SiO_2$ | $Na_2O$ | $B_2O_3$ | $Al_2O_3$ | |
| 8 | 50.0 | 3.0 | 30.0 | 17.0 | >1000 |
| 9 | 50.0 | 15.0 | 20.0 | 15.0 | >1000 |
| 10 | 50.0 | 20.0 | 15.0 | 15.0 | 900 |
| 11 | 50.0 | 30.0 | 10.0 | 10.0 | 600 |
| 12 | 50.0 | 8.0 | 30.0 | 12.0 | >1000 |
| 13 | 50.0 | 9.0 | 29.0 | 2.0 | >1000 |
| comparative example | | | | | |
| 14 | 70.0 | 8.0 | 12.0 | 10.0 | 100 |
| 15 | 8.0 | 8.0 | 70.0 | 14.0 | crack generation during connection |
| 16 | 50.0 | 35.0 | 10.0 | 5.0 | crack generation during connection |

From the results shown in Table 1, it is understood that specimen Nos. 1~13 of the first aspect of the invention show good durability against sodium corrosion since cracks are not generated at least for 400 hours. However, specimen No. 18 of the comparative example can not endure for more than 100 hours, and specimen Nos. 15 and 16 are cracked when the connection operation is performed. The reason for such crack generation during the connection operation is that a thermal expansion coefficient of the glass is not suitable for beta alumina or alpha alumina.

EXAMPLE 2

A charge-discharge test was performed with respect to a NaS cell using the glass joint body of the first aspect of the invention. That is to say, with respect to the sodium-sulfur cells wherein the beta alumina tube and the insulator made of alpha-alumina are connected as shown in FIG. 1 by using glasses of the specimen Nos. 1~13 in example 1, the charge-discharge test was performed under a temperature of 350° C. and a current density of 100 mA/cm². As a result, all of the sodium-sulfur cells endured at least 1000 cycles.

EXAMPLE 3

In order to examine a connection state of a glass joint specimen and durability against sodium corrosion of a glass having various compositions in the second and third aspects of the invention, the following tests were performed.

At first, glass frits having various chemical compositions as shown in Table 2 were prepared by measuring respective raw materials by means of an electric balance, mixing and crushing the raw materials in a mortar made of alumina by using an alumina pestle, melting the mixed and crushed raw materials at 1200°~1600° C. in a platinum crucible, and dropping the melted raw materials into water. In order to make properties of the glass uniform, the thus prepared glass frits were further crushed in a mortar made of alumina by using an alumina pestle, and were re-melted at the same temperature as that of the above melting operation in a crucible made of platinum. After that, the thus remelted glass was dropped into water, and the cooled glass was further crushed in a mortar made of alumina by using a alumina pestle to obtain glass frits for a connection.

Figure 4:
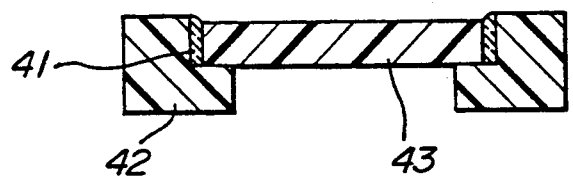
FIG. 4 is a cross sectional view showing another embodiment of a specimen to which an anti-sodium test is performed.

By using the thus obtained glass frits, an α alumina ring 42 having a diameter of 32 mm and a beta alumina circular plate 43 having a diameter of 25 mm and a thickness of 3 mm were connected with each other at 800°~1000° C. to obtain a glass joint specimen as shown in FIG. 4. Then, the glass joint specimen was gradually cooled from 800° C. to 300° C. at a cooling rate of 0.5° C./min to eliminate stresses. After that, the thus formed glass joint specimen was immersed in sodium at 450° C. under $N_2$ atmosphere every 100 hours, and sodium was eliminated by using methanol. Then, crack generation was examined by using fluorescent penetrant inspection every 100 hours. Moreover, generation of a colored layer was also examined by observing a cross section of the glass joint specimen by means of an optical microscope. The results and the chemical compositions of the conjunction glasses used in example 3 are shown in Table 2. It should be noted that, in Table 2, $SiO_2 < 1.0$ wt % represents the conjunction glass including substantially no $SiO_2$.

to which less than 10 wt % of $SiO_2$ is added positively, generate no cracks for 100 hours but have colored layers due to corrosion. Contrary to this, the specimen Nos. 3~32, to which substantially no $SiO_2$ is included, generate no cracks and no colored layers, and show better durability against sodium corrosion than those of specimen Nos. 1 and 2.

EXAMPLE 4

A charge-discharge test was performed with respect to a NaS cell using the glass joint body of the second and third aspects of the invention. That is to say, with respect to the sodium-sulfur cells wherein the beta alumina and the alpha alumina are connected as shown in FIG. 2 by using glasses of specimen Nos. 1~32 in exam-

TABLE 2

| Specimen No. | Chemical composition (wt %) | | | | | | | | | | Crack generation time (hr) | Generation of colored layer |
|---|---|---|---|---|---|---|---|---|---|---|---|---|
| | $SiO_2$ | $B_2O_3$ | $Na_2O$ | $Al_2O_3$ | $TiO_2$ | MgO | $ZrO_2$ | $Ta_2O_5$ | $La_2O_3$ | $Y_2O_3$ | | |
| present invention | | | | | | | | | | | | |
| 1 | 9.0 | 56.0 | 20.0 | 15.0 | | | | | | | >1000 | existent |
| 2 | 5.0 | 65.0 | 17.0 | 13.0 | | | | | | | >1000 | existent |
| 3 | <1.0 | 68.0 | 18.0 | 14.0 | | | | | | | >1000 | none |
| 4 | <1.0 | 80.0 | 7.0 | 13.0 | | | | | | | >1000 | none |
| 5 | <1.0 | 65.0 | 7.0 | 28.0 | | | | | | | >1000 | none |
| 6 | <1.0 | 72.0 | 25.0 | | 3.0 | | | | | | >1000 | none |
| 7 | <1.0 | 61.0 | 27.0 | | 12.0 | | | | | | >1000 | none |
| 8 | <1.0 | 58.0 | | 23.0 | | 19.0 | | | | | >1000 | none |
| 9 | <1.0 | 50.0 | | 36.0 | | 14.0 | | | | | >1000 | none |
| 10 | <1.0 | 65.0 | | 16.0 | | 19.0 | | | | | >1000 | none |
| 11 | <1.0 | 61.2 | | 16.3 | | 22.5 | | | | | >1000 | none |
| 12 | <1.0 | 62.2 | | 22.8 | | 15.0 | | | | | >1000 | none |
| 13 | <1.0 | 43.0 | | 32.0 | | 25.0 | | | | | >1000 | none |
| 14 | <1.0 | 50.0 | | 17.0 | | 33.0 | | | | | >1000 | none |
| 15 | <1.0 | 68.0 | | 9.0 | | 23.0 | | | | | >1000 | none |
| 16 | <1.0 | 57.0 | | 17.0 | | 26.0 | | | | | >1000 | none |
| 17 | <1.0 | 67.8 | | | | 32.2 | | | | | >1000 | none |
| 18 | <1.0 | 66.6 | | 27.9 | | 5.5 | | | | | >1000 | none |
| 19 | <1.0 | 40.7 | | 25.6 | | 33.7 | | | | | >1000 | none |
| 20 | <1.0 | 45.4 | | 25.0 | | 29.6 | | | | | >1000 | none |
| 21 | <1.0 | 62.2 | | 22.8 | | 15.0 | | | | | >1000 | none |
| 22 | <1.0 | 46.0 | | 12.0 | | 42.0 | | | | | >1000 | none |
| 23 | <1.0 | 50.0 | | 36.0 | | 14.0 | | | | | >1000 | none |
| 24 | <1.0 | 59.0 | | 38.0 | | 12.0 | | | | | >1000 | none |
| 25 | <1.0 | 62.0 | 16.0 | 13.0 | | 9.0 | | | | | >1000 | none |
| 26 | <1.0 | 53.0 | 9.0 | 21.0 | | 17.0 | | | | | >1000 | none |
| 27 | <1.0 | 65.0 | 17.0 | 14.0 | 4.0 | | | | | | >1000 | none |
| 28 | <1.0 | 68.0 | 24.0 | 5.0 | 3.0 | | | | | | >1000 | none |
| 29 | <1.0 | 40.0 | | 29.0 | | | | 31.0 | | | >1000 | none |
| 30 | <1.0 | 65.0 | 10.0 | 20.0 | | | 5.0 | | | | >1000 | none |
| 31 | <1.0 | 40.0 | | 26.0 | | | | | 30.0 | 4.0 | >1000 | none |
| 32 | <1.0 | 30.0 | 8.0 | 17.0 | | | 45.0 | | | | >1000 | none |
| comparative example | | | | | | | | | | | | |
| 33 | 15.0 | 45.0 | 23.0 | 17.0 | | | | | | | 700 | existent |
| 34 | 26.0 | | 36.0 | 38.0 | | | | | | | crack generation in case of connection | |
| 35 | <1.0 | 24.0 | 12.0 | 20.0 | | | | | 44.0 | | poor glass generation | |
| 36 | <1.0 | 35.0 | 3.0 | 27.0 | | | | | | | crack generation after 3 days from connection | |

From the results shown in Table 2, it is understood that specimen Nos. 1~32 of the second and third aspects of the invention show good durability against sodium corrosion since cracks are not generated at least for 5 hours, but specimen Nos. 33~36 of the comparative example can not endure for 1000 hours and do not show sufficient durability against sodium corrosion since cracks are generated. Moreover, among the specimens according to the invention, specimen Nos. 1 and 2, ple 3, the charge-discharge test was performed under a temperature of 350° C. and a current density of 150 mA/cm². As a result, all the sodium-sulfur cells endured at least 1000 cycles.

EXAMPLE 5

Figure 5:
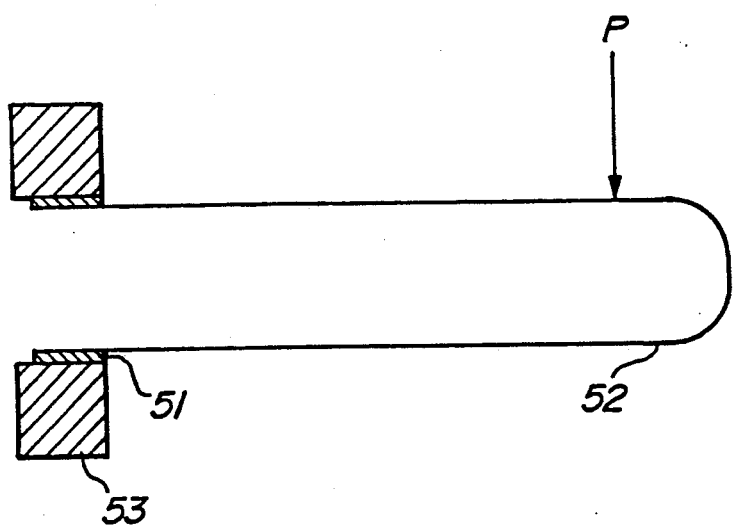
FIG. 5 is a cross sectional view for explaining a cantilever bending test.

A cantilever bending test was performed with respect to a glass joint specimen using the glasses of specimen Nos. 1~21 shown in Table 3. That is to say, with respect to the glass joint specimen shown in FIG. 5 wherein a beta alumina tube 52 having an inner diameter of 20 mm and a thickness of 2 mm and an α-alumina ring 53 having an outer diameter of 35 mm are connected by using the glass mentioned above, a load P is applied at a position 200 mm apart from a connection portion of the beta alumina tube 52. Then, a load when the beta alumina tube 52 is broken is measured as a break load. The results are shown in Table 3.

TABLE 3

| Specimen No. | \<chemical composition (wt %)\> | | | | | | Break load P (Kgf) |
|---|---|---|---|---|---|---|---|
| | SiO$_2$ | B$_2$O$_3$ | Na$_2$O | Al$_2$O$_3$ | MgO | TiO$_2$ | |
| 1 | <1.0 | 43.0 | | 32.0 | 25.0 | | 31.0 |
| 2 | <1.0 | 50.0 | | 17.0 | 33.0 | | 32.5 |
| 3 | <1.0 | 68.0 | | 9.0 | 23.0 | | 30.0 |
| 4 | <1.0 | 58.0 | | 23.0 | 19.0 | | 36.5 |
| 5 | <1.0 | 65.0 | 3.0 | 15.0 | 17.0 | | 30.0 |
| 6 | <1.0 | 65.0 | | 16.0 | 19.0 | | 38.0 |
| 7 | <1.0 | 61.2 | | 22.8 | 15.0 | | 39.5 |
| 8 | <1.0 | 62.2 | | 10.3 | 22.5 | | 37.0 |
| 9 | <1.0 | 57.0 | | 17.0 | 20.0 | | 29.5 |
| 10 | <1.0 | 67.8 | | | 32.2 | | 28.0 |
| 11 | <1.0 | 66.6 | | 27.9 | 5.5 | | 31.0 |
| 12 | <1.0 | 40.7 | | 22.6 | 33.7 | | 31.0 |
| 13 | <1.0 | 45.4 | | 25.0 | 29.6 | | 29.5 |
| 14 | <1.0 | 62.2 | | 22.8 | 15.0 | | 30.0 |
| 15 | <1.0 | 46.0 | | 12.0 | 42.0 | | 23.0 |
| 16 | <1.0 | 50.0 | | 36.0 | 14.0 | | 18.5 |
| 17 | <1.0 | 59.0 | | 38.0 | 12.0 | | 20.0 |
| 18 | <1.0 | 68.0 | 18.0 | 14.0 | | | 28.0 |
| 19 | <1.0 | 62.0 | 16.0 | 13.0 | 9.0 | | 30.5 |
| 20 | <1.0 | 61.0 | | 27.0 | | 12.0 | 29.0 |
| 21 | <1.0 | 65.0 | 17.0 | 14.0 | | 4.0 | 29.5 |

From the results shown in Table 3, among the glasses according to the second and third aspects of the invention, specimen Nos. 16 and 17 in which 30 wt % or more of Al$_2$O$_3$ is included and specimen No. 15 in which 40 wt % or more of MgO is included show small break loads P as compared with the other specimens. Moreover, the specimen Nos. 4, 6, 7, 8 in which 13~28 wt % of Al$_2$O$_3$ and 12~25 wt % of MgO are included show large break loads P as compared with the other specimens. It should be noted that, among the specimens including substantially no SiO$_2$, there is no difference in durability against sodium corrosion.

EXAMPLE 6

In order to examine a connection state of a glass joint specimen and durability against sodium corrosion of a glass having various compositions in the fourth aspect of the invention, the following tests were performed.

At first, glass frits having various chemical compositions as shown in Table 4 were prepared by measuring respective raw materials by means of an electric balance, mixing and crushing the raw materials in a mortar made of alumina, melting the mixed and crushed raw materials at 1400° C. in a platinum crucible, casting the melted raw materials into a metal saucer whose inner surface is spread by carbon paste to effect a rapid cooling, and crushing the cooled glass. In order to make properties of the glass uniform, the thus prepared glass frits were further crushed in a mortar made of alumina by using an alumina pestle, and were remelted at 1400° C. in a crucible made of platinum. After that, the thus re-melted glass was rapidly cooled, and the cooled glass was further crushed in a mortar made of alumina by using an alumina pestle to obtain glass frits for a connection.

By using the thus obtained glass frits, an alpha alumina circular plate 31 having a diameter of 40 mm and a thickness of 5 mm was connected to a beta alumina tube 32 having an outer diameter of 20.0 mm and an inner diameter of 17.5 mm at 1000° C. to obtain a glass joint specimen, as shown in FIG. 3. Then, the glass joint specimen was gradually cooled from 700° C. to 300° C. at a cooling rate of 0.5° C./min to eliminate stresses. After that, the thus formed glass specimen was immersed in sodium at 450° C. under N$_2$ atmosphere every 100 hours, and sodium was examined by using methanol. Then, crack generation as eliminated by using fluorescent penetrant inspection every 100 hours. The results and the chemical compositions of the conjunction glasses are shown in Table 4.

TABLE 4

| Specimen No. | Chemical composition (wt %) | | | | | Crack generation time (hr) |
|---|---|---|---|---|---|---|
| | SiO$_2$ | Na$_2$O | B$_2$O$_3$ | Al$_2$O$_3$ | MgO | |
| present invention | | | | | | |
| 1 | 64.0 | 5.0 | 13.0 | 13.0 | 5.0 | 500 |
| 2 | 60.0 | 5.0 | 17.0 | 13.0 | 5.0 | 800 |
| 3 | 50.0 | 5.0 | 27.0 | 13.0 | 5.0 | 1000 |
| 4 | 40.0 | 3.0 | 33.0 | 19.0 | 5.0 | >2000 |
| 5 | 30.0 | 3.0 | 39.5 | 20.0 | 7.5 | >2000 |
| 6 | 20.0 | 5.0 | 47.0 | 20.0 | 7.5 | >2000 |
| 7 | 10.0 | 8.0 | 50.0 | 25.0 | 7.0 | 600 |
| 8 | 32.0 | 4.5 | 37.0 | 19.0 | 7.5 | >2000 |
| 9 | 36.0 | 4.5 | 33.0 | 21.0 | 5.5 | >2000 |
| 10 | 35.0 | 9.0 | 34.0 | 16.0 | 6.0 | 1700 |
| 11 | 32.0 | 3.0 | 33.0 | 29.0 | 3.0 | 1200 |
| 12 | 34.0 | 3.0 | 35.0 | 24.0 | 4.0 | >2000 |
| 13 | 34.0 | 3.0 | 38.0 | 16.0 | 9.0 | >2000 |
| 14 | 34.0 | 3.0 | 38.0 | 16.0 | 9.0 | >2000 |
| 15 | 38.0 | 3.0 | 41.0 | 13.0 | 5.0 | 1600 |
| 16 | 35.0 | 4.0 | 30.0 | 12.0 | 19.0 | 1600 |
| 17 | 34.0 | 18.0 | 30.0 | 13.0 | 5.0 | 1100 |
| Comparative example | | | | | | |
| 18 | 67.0 | 4.0 | 19.0 | 7.0 | 3.0 | crack generation during connection |
| 19 | 30.0 | 4.5 | 30.0 | 32.0 | 3.5 | crack generation during connection |
| 20 | 35.0 | 4.0 | 28.0 | 10.0 | 23.0 | crack generation during connection |
| 21 | 32.0 | 22.0 | 30.0 | 11.0 | 5.0 | crack generation during connection |

From the results shown in Table 4, it is understood that specimen Nos. 1~17 of the fourth aspect of the invention show good anti-corrosion properties since cracks are not generated at least for 400 hours, but specimen Nos. 18~21 of the comparative example experience cracks when the connection operation is performed The reason for the crack generation during the connection operation is that a thermal expansion coefficient of the glass is not equal to that of the beta or alpha alumina.

EXAMPLE 7

A charge-discharge test was performed with respect to a NaS cell using the glass joint body of the fourth aspect of the invention. That is to say, with respect to the sodium-sulfur cells wherein the beta alumina tube and the insulator made of alpha alumina are connected as shown in FIG. 1 by using glasses of specimen Nos. 1~17 in example 6, the charge-discharge test was performed under a temperature of 350° C. and a current density of 150 mA/cm². As a result, all the sodium-sulfur cells endured at least 1000 cycles.

EXAMPLE 8

With respect to specimen Nos. 4~6, 8, 9, 12~18 among the glass joint specimens in example 6, a temperature ascent and descent test from room temperature to 350° C. was performed under $N_2$ atmosphere, and a crack generation of the connection portion was examined every 5 times. As a result, all of the specimens showed no crack generation after 10 repeated tests. Moreover, specimen Nos. 4, 6, 12, 13, 14 show a small crack generation after 15 tests, and specimen Nos. 5, 8, 9 show no crack generation even after 30 tests.

As mentioned above, according to the invention, since ceramics and ceramics are connected with each other by using a glass having a predetermined chemical composition, a durability against sodium corrosion of the glass joint body can be improved. Therefore, if the present invention is applied to the glass joint body used in a high temperature type secondary cell such as a sodium-sulfur cell or Alkali Metal Thermo-Electric Converter, life of the apparatus can be increased.

What is claimed is:

1. A glass joint body comprising a first ceramic member and a second ceramic member connected by a glass consisting of 10~64 wt % of $SiO_2$, 3~30 wt % of $Na_2O$, at least 2 wt % $Al_2O_3$ and the balance of $B_2O_3$.

2. A glass joint body according to claim 1, wherein said first and second ceramic members are a beta alumina member and an insulation ceramic member is a high temperature secondary cell or in an alkali Metal Thermo-Electric Converter.

3. A glass joint body comprising a first ceramic member and a second ceramic member connected by a glass consisting of 10~64 wt % of $SiO_2$, 3~20 wt % of $Na_2O$, 12~30 wt % of $Al_2O_3$, 20 wt % or less of MgO, and the balance of $B_2O_3$.

4. A glass joint body according to claim 3, wherein said first and second ceramic members are a beta alumina member and an insulation ceramic member in a high temperature secondary cell or in an Alkali Metal Thermo-Electric Converter.

* * * * *